April 1, 1924.
C. F. A. NUEBLING
VEHICLE WHEEL RIM
Filed Jan. 15, 1923
1,489,142
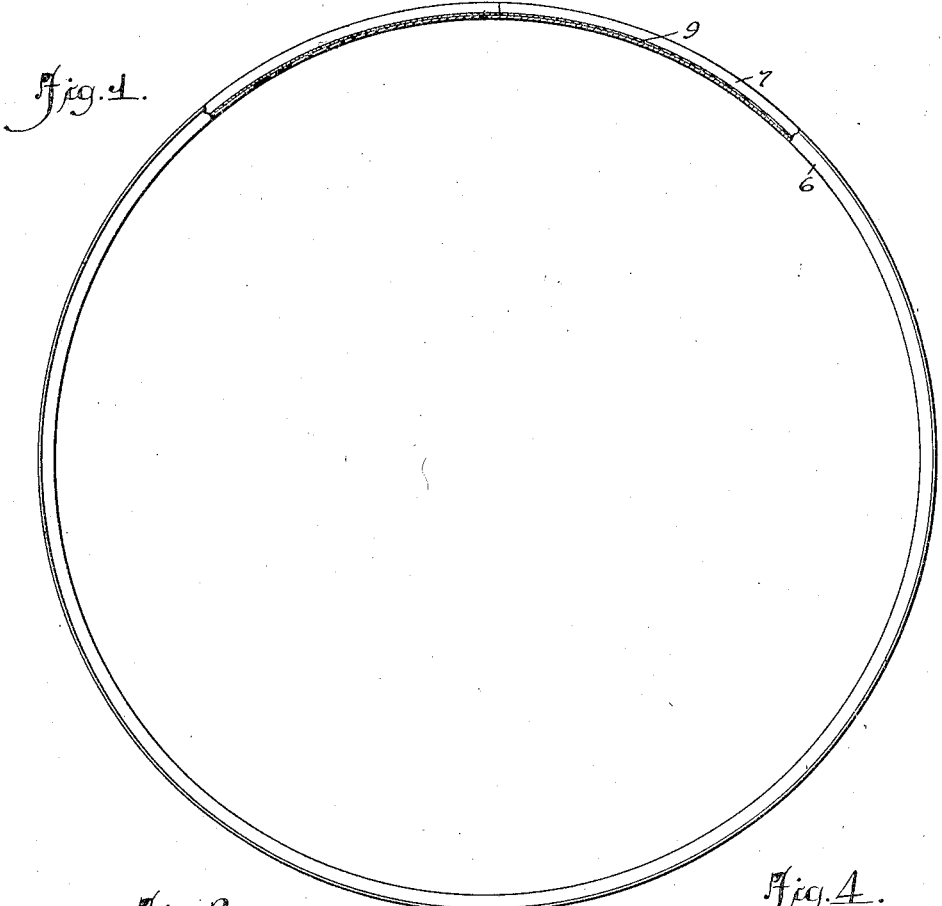
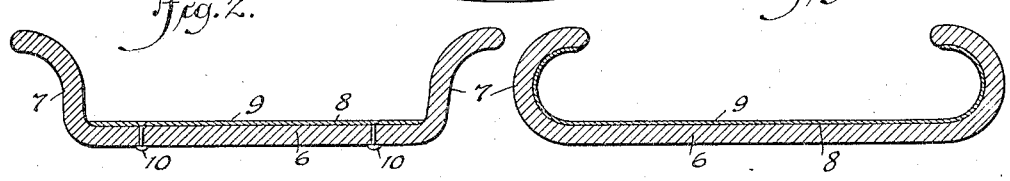
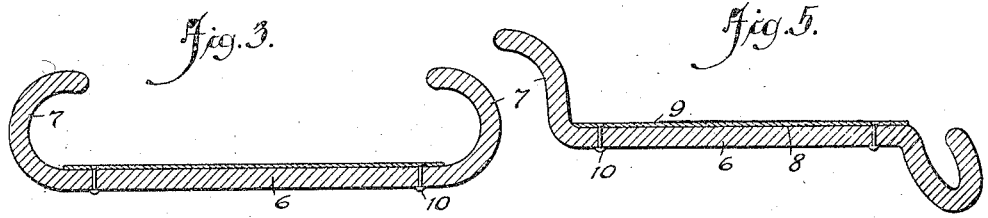
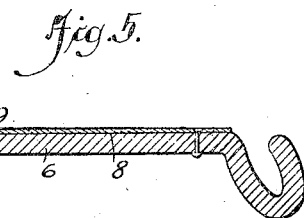
WITNESSES
INVENTOR
C. F. A. NUEBLING
BY
ATTORNEYS Patented Apr. 1, 1924.

1,489,142

UNITED STATES PATENT OFFICE.

CHARLES F. A. NUEBLING, OF HEWLETT, NEW YORK.

VEHICLE WHEEL RIM.

Application filed January 15, 1923. Serial No. 612,783.

*To all whom it may concern:*

Be it known that I, CHARLES F. A. NUEBLING, a citizen of the United States, and a resident of Hewlett, Long Island, in the county of Nassau and State of New York, have invented a new and Improved Vehicle Wheel Rim, of which the following is a full, clear, and exact description.

This invention relates to improvements in vehicle wheels, and has particular reference to a rim construction used in connection with pneumatic tires.

In vehicle wheels employing pneumatic tires with inner tubes, it is well known that moisture coming in contact with the inner surface of the metallic rim between the sides thereof causes corrosion or rusting of the rim and that the inner tube coming in contact with this rust is affected thereby to such an extent that the material of the tube rapidly deteriorates. This difficulty has been partly overcome by the use of a liner of fabric material introduced into the tire casing between the inner tube and rim, but experience has shown that unless this liner is properly placed when mounting the tire on the rim the same causes a pinching of the inner tube and consequently rupture thereof.

The present invention is designed to overcome the above difficulties by the provision of an improved tire rim of such construction as to reduce the possibility of corrosion of the inner surface thereof and prevent any corrosion from coming in contact with the inner tube of the tire.

Another object is to provide a rim which may be made in standard designs and sizes and which is of comparatively simple and inexpensive construction.

The above and other objects will appear more clearly from the following detail description, when taken in connection with the accompanying drawing, which illustrates preferred embodiments of the inventive idea.

In the drawing—

Figure 1 is a side elevation, partly broken away and shown in section, of a rim constructed in accordance with the present invention;

Figure 2 is an enlarged transverse section through the straight side form of rim showing the application of the invention thereto;

Figure 3 is a similar view of the clincher type rim illustrating one form of the invention;

Figure 4 is a view similar to Figure 3 showing a slightly different form; and

Figure 5 is also a cross sectional view of the removable side type of rim illustrating the application of the invention thereto.

The rim is shown in each of the embodiments illustrated as comprising a body portion 6 having the sides 7 with the usual annular inner surface 8, which is ordinarily engaged by the beads of the tire casing when the wheel is assembled.

The present invention contemplates the provision of a protective lining for the usual inner tube of a pneumatic tire, which is preferably in the form of an annular band 9 encircling the inner surface 8 of the rim. This band or member 9 is made of a non-corrosive material, such as copper, brass, zinc, or lead, and may be secured to the body of the rim either by rivets 10, as shown in Figures 2, 3 and 5, or by electric or oxy-acetylene welding, in which case the band would appear as in Figure 4. In the latter figure, said band is also illustrated as covering the inner surfaces of the sides 7 of the rim. However, in order that the band produce the most efficient results it is only necessary that the same cover the central portion of the inner surface of the body of the rim so that said portion will be segregated from the adjacent or inner edges of the beads of the tire casing.

It will be obvious from the foregoing description that, with the protective lining in position on the inner surface of the tire rim, corrosion of said rim adjacent the inner edges of the beads of the tire casing will be prevented and that, therefore, the inner tube will be entirely protected against corrosive effects.

What is claimed is:

A tire rim comprising an annular body having side flanges, a flat metallic non-corrosive band encircling said body between said flanges for spacing the tube of the tire from the rim, said band being of a uniform thickness throughout, and fastening devices extending through said body and said band and having their outer ends flush with the surface of said band.

CHARLES F. A. NUEBLING.